US010742657B2

(12) United States Patent
Jerrell et al.

(10) Patent No.: US 10,742,657 B2
(45) Date of Patent: Aug. 11, 2020

(54) ACCESSING SHARED RESOURCES WITHOUT SYSTEM GROUPS

(71) Applicant: International Business Machines Corporation, Armonk, NY (US)

(72) Inventors: Richard O. Jerrell, Littleton, MA (US); Paul Spencer, Moab, UT (US); Galia Diamant, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 16/032,860

(22) Filed: Jul. 11, 2018

(65) Prior Publication Data

US 2020/0021592 A1    Jan. 16, 2020

(51) Int. Cl.
*H04L 29/06* (2006.01)
*G06F 9/50* (2006.01)
*G06F 21/62* (2013.01)

(52) U.S. Cl.
CPC ............ *H04L 63/10* (2013.01); *G06F 9/5011* (2013.01); *G06F 21/6209* (2013.01); *H04L 63/08* (2013.01)

(58) Field of Classification Search
None
See application file for complete search history.

(56) References Cited

U.S. PATENT DOCUMENTS 5,737,523 A     4/1998   Callaghan et al.
8,627,414 B1 *  1/2014   McCune ............... H04L 9/3234
                                                      726/4
9,609,020 B2 *  3/2017   White .................... H04L 63/20
2004/0003112 A1* 1/2004  Alles ..................... G06F 9/5011
                                                      709/237
2007/0143851 A1* 6/2007  Nicodemus ......... H04L 63/1433
                                                      726/25
2012/0133967 A1  5/2012  Yasui
2013/0318228 A1* 11/2013 Raja ..................... G06F 3/0635
                                                      709/224
2019/0081983 A1* 3/2019  Teal ........................ G06F 21/55

FOREIGN PATENT DOCUMENTS

CN          106778245 A      5/2017

\* cited by examiner

*Primary Examiner* — Maung T Lwin
(74) *Attorney, Agent, or Firm* — Pepper Hamilton LLP

(57) ABSTRACT

Embodiments can provide a computer implemented method in a data processing system including a processor and a memory having instructions, which are executed by the processor to cause the processor to implement the method for accessing a shared resource. The method includes the following steps: identifying a process having elevated privileges as a background process; providing an authorized user list including at least one user identification number; providing a communication endpoint connectable to a user or a program; receiving a user identification number of the user or the program through the communication endpoint; checking whether the user identification number is in the authorized user list. If the user identification number is in the list, a file descriptor associated with the shared resource is provided; and the file descriptor is transferred to the user or the program through the communication endpoint.

20 Claims, 4 Drawing Sheets

ACCESSING SHARED RESOURCES WITHOUT SYSTEM GROUPS

TECHNICAL FIELD

The present application relates generally to a system, a method and a computer program product that can be used to access shared resources.

BACKGROUND

In a Unix system or Unix-like operating systems, such as AIX, A/UX, HP-UX, IRIX, Linux, Minix, Ultrix, Xenix, Xinu, XNU, and the like, security for shared resources, such as device drivers, is provided via filesystem level access controls on device nodes of the drivers. Once a particular device node is opened, access to the corresponding device driver is usually unrestricted. Access to the particular device node is traditionally granted by adding authorized users to a system group which owns the particular device node. This presents an administrative problem where a superuser (root) with elevated privileges needs to add each individual to the appropriate system group. Due to separation of duties in large environments (for example more than 1000 servers), the administrative problem can lead to cumbersome coordination of multiple teams, as a list of the authorized users may change over time.

SUMMARY

Embodiments can provide a computer implemented method in a data processing system including a processor and a memory having instructions, which are executed by the processor to cause the processor to implement the method for accessing a shared resource, including: identifying, by an operating system, a process having elevated privileges as a background process; providing, by the operating system, an authorized user list including at least one user identification number, wherein the authorized user list is configurable by the background process; providing, by the operating system, a communication endpoint connectable to a user or a program; receiving, from the user or the program, a user identification number of the user or the program through the communication endpoint; and checking, by the operating system, whether the user identification number of the user or the program is in the authorized user list. If the user identification number of the user or the program is in the authorized user list, a file descriptor associated with the shared resource is provided by the operating system; and the file descriptor is transferred by the operating system to the user or the program through the communication endpoint.

Embodiments can further provide a method further including sending, by the operating system, a clear text challenge; receiving, from the user or the program, an encrypted challenge; if the encrypted challenge is different from a predefined challenge, the user or the program is disconnected from the communication endpoint, wherein the communication endpoint is a Unix domain socket.

Embodiments can further provide a method further including transferring, by the operating system, the authorized user list to the shared resource.

Embodiments can further provide a method further including checking, by the shared resource, whether the process has the elevated privileges, if the process has the elevated privileges, storing, by the shared resource, a process identification number of the background process, wherein the background process is a daemon process.

Embodiments can further provide a method further including checking, by the shared resource, whether the user or the program is a root or the daemon process. If the user or the program is the root or the daemon process, at least one advanced operation on the shared resource is performed by the user or the program. The advanced operation includes at least one of configuring at least one parameter of the shared resource, and modifying the authorized user list.

Embodiments can further provide a method, wherein if the user or the program is not the root or the daemon process, the method further including: checking, by the shared resource, whether the user identification number of the user or the program is in the authorized user list. If the user identification number of the user or the program is in the authorized user list, the shared resource through the file descriptor is accessed by the user or the program.

Embodiments can further provide a method further including accessing, by the user or the program, an interface of the shared resource, wherein the operating system is a Unix operating system or a Unix-like operating system.

Embodiments can provide a system for accessing a device driver, including: a device driver accessing processor, configured to: identify, by an operating system, a process having elevated privileges as a background process; provide, by the operating system, an authorized user list including at least one user identification number, wherein the authorized user list is configurable by the background process; transfer, by the operating system, the authorized user list to the shared resource; provide, by the operating system, a communication endpoint connectable to a user or a program; receive, from the user or the program, a user identification number of the user or the program through the communication endpoint; and check, by the operating system, whether the user identification number of the user or the program is in the authorized user list. If the user identification number of the user or the program is in the authorized user list, the device driver accessing processor is further configured to provide, by the operating system, a file descriptor associated with the device driver; transfer, by the operating system, the file descriptor to the user or the program through the communication endpoint; and access, by the user or the program, an interface of the device driver.

In another illustrative embodiment, a computer program product including a computer usable or readable medium having a computer readable program is provided. The computer readable program, when executed on a processor, causes the processor to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention provides a system, method and computer product for accessing a shared resource. In some embodiments, a background process daemon can be used to grant access to the shared resource without requiring elevated privileges by a client (a user or a program executed by the user) or a daemon administrator. In particular, it is unnecessary for the client to obtain group membership for the shared resource. It is also unnecessary for the daemon administrator to have root access for adjusting user groups. Instead, a file descriptor transfer mechanism through a communication endpoint, (for example, UNIX domain socket or inter-process communication socket), and a configuration file (i.e., a list of authorized users) editable by the daemon administrator are provided for access controls. In an embodiment, a security mechanism to authenticate the client is further provided.

Figure 1:
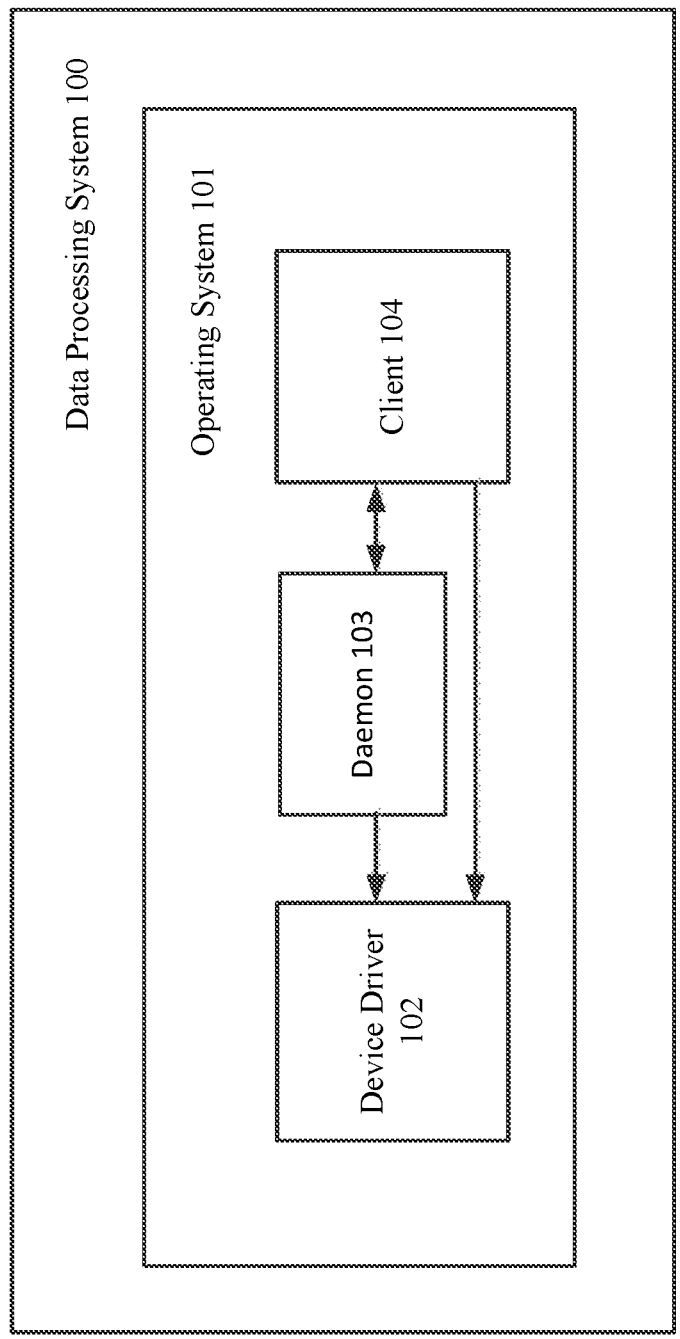
FIG. 1 is a block diagram of an example data processing system in which aspects of the illustrative embodiments are implemented.

FIG. 1 is a block diagram of an example data processing system in which aspects of the illustrative embodiments are implemented. Data processing system 100 is an example of a computer, such as a server or client, in which computer usable code or instructions implementing the process for illustrative embodiments of the present invention are located. In one embodiment, the data processing system 100 represents a computing device, which implements operating system 101. In some embodiments, the operating system 101 can be Unix system or Unix-like operating systems, such as AIX, A/UX, HP-UX, IRIX, Linux, Minix, Ultrix, Xenix, Xinu, XNU, and the like.

In the depicted example, device driver 102, daemon 103, and client 104 run on the operating system 101. In some embodiments, device driver 102 can be any driver configured to drive a particular device of the data processing system 100, for example, a printer driver, a USB driver, a keyboard driver, network adapter driver, monitor adapter driver, DVD/CD-ROM driver, pointing device driver, etc. Daemon 103 is a program that runs continuously and exists for a purpose of handling periodic service requests that the operating system 101 expects to receive. Daemon 103 runs as a background process, rather than being under a direct control of an interactive user. In an embodiment, the client 104 can be a user who intends to access the device driver 102. In another embodiment, the client 104 can be a program running on the operating system 101, for example, WPS office, Acrobat reader, Web browser, etc. The program is executed by the user.

Figure 2:
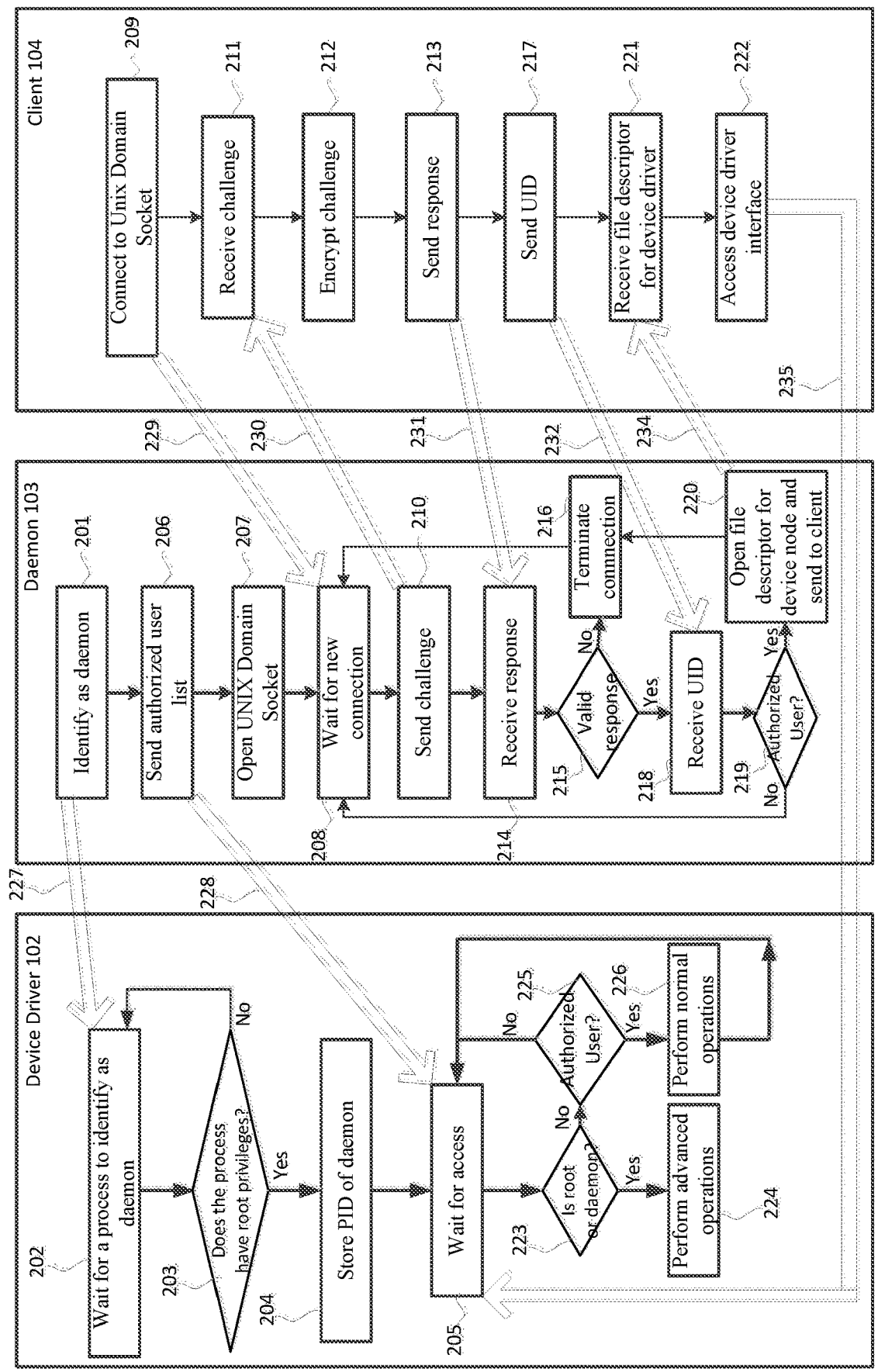
FIG. 2 depicts a flowchart illustrating a method of accessing a device driver, according to some embodiments described herein.

FIG. 2 depicts a flowchart illustrating a method of accessing a device driver, according to some embodiments described herein. Referring to FIG. 2, client 104 accesses device driver 102 by means of daemon 103. A list of authorized users is maintained and edited by the daemon 103 administrator without elevated privileges. In an embodiment, the client 104 (a user or a program executed by the user) intends to access the device driver 102. If the client 104 is in the list of authorized users maintained by the daemon 103 administrator, then the client 104 can access the device driver 102.

In another embodiment, an authentication mechanism, for example, a challenge-response mechanism for security is established between the daemon 103 and the client 104. In some embodiments, the device driver 102 provides different privileges for an advanced user and a normal authorized user. For the advanced user, for example, daemon 103 or a superuser (root), the device driver 102 allows the advanced user to perform advanced operations, in addition to normal operations. The advanced operations include configuring parameters of the device driver 102, modifying the list of authorized users, etc. For the normal authorized user, the device driver 102 only allows for normal operations. Specifically, the normal authorized user can access and use the device driver 102, but may not make any modifications to the device driver 102.

In an example, to make the device driver 102 trust that the list of authorized users has not been tampered with, the device driver 102 needs to know that the process administering the list is an authorized program. A process with root privileges i.e., user identification number (UID) is 0, identifies itself as an authorized daemon process (step 201) and notifies the device driver 102 of the authorized daemon process identification (step 227). Specifically, a system call ioctl (input/output control) is performed to identify the process with root privileges as the authorized daemon process. After the identification of authorized daemon process, the process with root privileges (i.e, daemon 103) can drop privileges to other standard operating system user.

In step 202, the device driver 102 keeps waiting for the identification of authorized daemon process performed in step 201. In an embodiment, after step 201 is performed, the device driver 102 checks whether the process has root privileges before the process drops the root privileges (step 203). If the process does not have root privileges, then device driver 102 goes back to step 202 to wait for the identification of authorized daemon process. Conversely, if the process has root privileges, then the device driver 102 stores PID (process identification number) of the daemon 103 (step 204). This stored PID is checked when daemon-only interfaces of the device driver are called subsequently to verify that the daemon 103 is still running and the process accessing those daemon-only interfaces is actually the authorized daemon process. At a minimum, the interfaces for configuring the parameters of the device driver 102 and updating the authorized user list are only accessible by the authorized daemon itself or a superuser.

In another embodiment, step 203 can be omitted, and step 204 can be performed after step 201 and step 202. After performing step 204, then the device driver 102 waits for accesses from the client 104 (step 205).

After performing step 201, in step 206, daemon 103 sends a list of authorized users, i.e., an authorized user list, to device driver 102 which is waiting for accesses from the client 104 (step 228). The daemon 103 stores the authorized user list and then opens a UNIX domain socket (step 207), and waits for the client 104 to connect to the UNIX domain socket (step 208). The UNIX domain socket is globally accessible in order to serve access requests to the shared resource (a device node for the secured device driver).

The client 104 connects to the UNIX domain socket (step 209) and notifies the daemon 103 of the connection (step 229). Upon acceptance of a connection to the UNIX domain socket, an authentication mechanism, for example challenge-response authentication, is provided between the daemon 103 and the client 104 for security. Specifically, the daemon 103 sends a clear-text challenge (step 210) to the client 104 (step 230), and the client 104 receives the challenge (step 211). Then the client 104 encrypts the challenge using a shared secret (step 212), and sends a response, i.e., the encrypted challenge (step 213), to the daemon 103 (step 231). The daemon 103 receives the response (step 214), and checks whether the response is valid (step 215). If the response is not valid, for example the received response is different from the predefined response, then the client 104 is disconnected from the UNIX domain socket (step 216). Conversely, if the received response is valid, then the connection is allowed to continue. This authentication mechanism permits the daemon 103 to validate the client 104 and trust the information that the client 104 sends.

The client 104 then sends UID of the client 104 (step 217) to the daemon 103 over the UNIX domain socket (step 232), and the daemon 103 receives the UID of the client 104 (step 218). In this embodiment, the daemon 103 checks whether the client 104 is an authorized user, for example, whether UID is in the authorized user list (step 219). If the client 104 is an authorized user, then the daemon 103 opens a file descriptor for a device node corresponding to the device driver 102 and returns the file descriptor to the client 104 using a credential transfer mechanism of the UNIX domain socket (step 220). After the opened file descriptor is sent to the client 104 (step 234), the connection between the client 104 and the daemon 103 is terminated (step 216). The device node is a special file, which is an interface to a device driver 102 that appears in a file system as if it were an ordinary file. The special file allows an application program to interact with a device through its device driver, using standard input/output system calls, such as read, write, ioctl, etc. The client 104 receives the file descriptor (step 221), starts to access the device driver interface (step 222) and notifies the device driver 102 of the access (step 235). Conversely, if the client 104 is not an authorized user, then the daemon 103 goes back to step 208, and waits for a new connection from the client 104.

In other embodiments, the challenge-response authentication can be omitted. Further, step 219 can also be omitted. In another embodiment, additional authentication mechanisms can be introduced for security consideration. Further, in an embodiment, the file descriptor and the UNIX domain socket are closed after the client 104 accesses the device driver 102, so as to prevent abuse of the UNIX domain socket. In step 219, if the UID is not in the authorized user list, then the UNIX domain socket is closed without transferring a file descriptor.

If a particular program or user accesses the device driver, the device driver 102 checks whether the program is root or demon (step 223). Specifically, the device driver 102 can check whether UID of the program or user is 0. If UID of the program or user is 0, then the program or user is a root. Conversely, if UID is not 0, then the device driver 102 further checks whether PID of the program or user is the PID stored in step 204. If the PID of the program or user is the PID stored in step 204, then the program or user is an authorized daemon process or daemon administrator. According to the result of step 223, if the program or user is either a root or an authorized daemon process, then the program or user can perform advanced operations (step 224), in addition to normal operations. For example, the program or user can configure parameters of the device driver 102 and modify the authorized user list. By contrast, if the program or user is neither a root nor an authorized daemon process, then the access is from the client 104.

For security, the device driver 102 checks again whether the client 104 is an authorized user (step 225). If the client 104 is an authorized user, then the client 104 can perform normal operations, i.e., non-administrative operations on the device driver 102 (step 226). The client 104 is now able to use the opened file descriptor to interact with the device driver 102, as if it had permission to open the device node itself. However, the client 104 is unable to identify itself as an authorized daemon process and is unable to modify the authorized user list. If the client 104 is an unauthorized user, then device driver 102 goes back to step 205 to wait for a new access from the client 104, the daemon 103 or a superuser.

In an embodiment, step 225 can be omitted. Specifically, in an embodiment, if the program or user is neither a root nor an authorized daemon process, then the client 104 directly performs normal operations without further verifying whether the client 104 is authorized.

Figure 3:
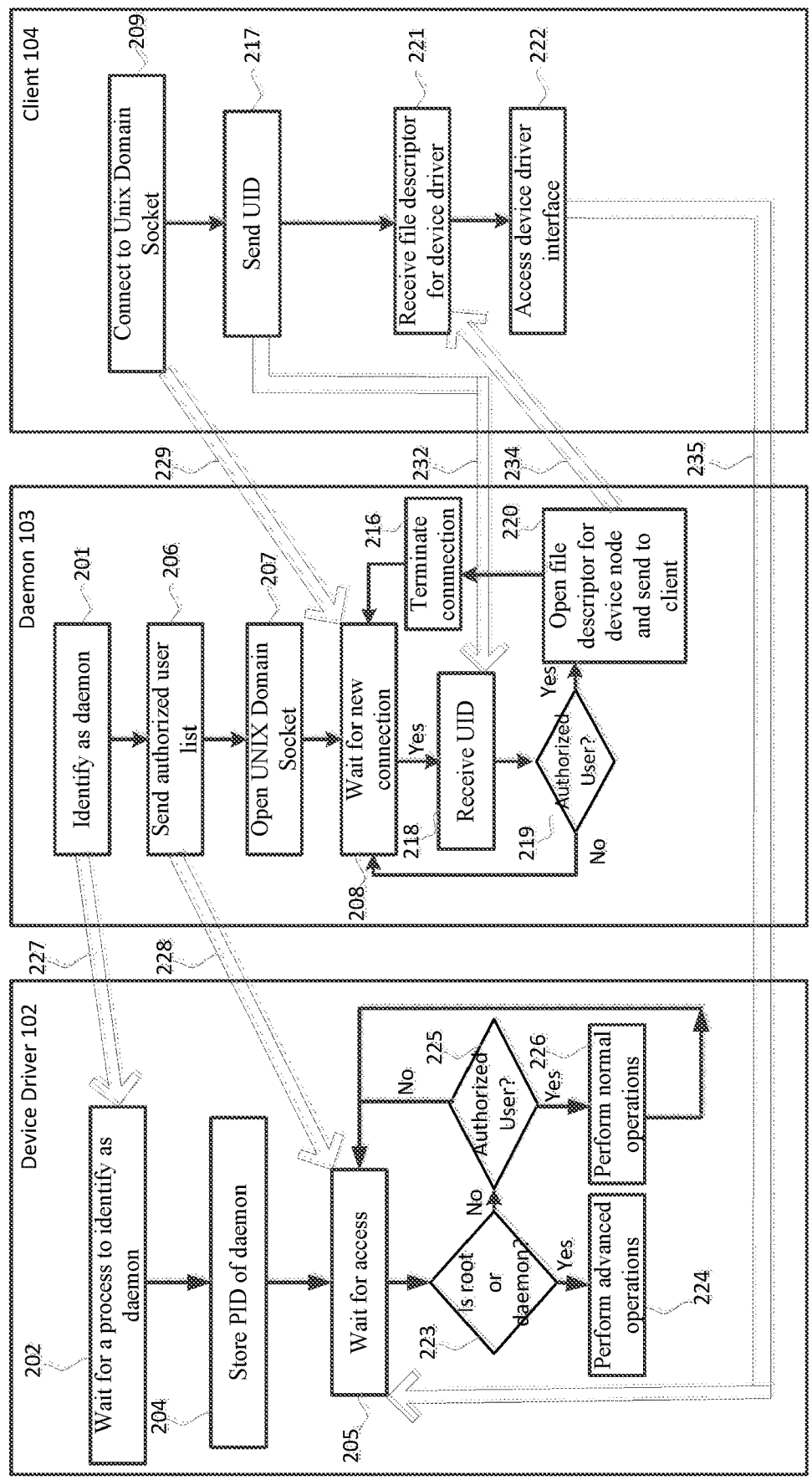
FIG. 3 depicts a flowchart illustrating a method of accessing a device driver, according to other embodiments described herein.

FIG. 3 depicts a flowchart illustrating a method of accessing a device driver, according to other embodiments described herein. For brevity, the steps in FIG. 3 that are the same as those in FIG. 2 are marked with the same reference numbers, and the repetitive descriptions are omitted here. As shown in FIG. 3, in this embodiment, steps 210-214, i.e., challenge-response mechanism are omitted. Client 104 can directly send UID (step 217) upon connection to Unix Domain Socket (step 209). Step 203 is also omitted, i.e., the device driver 102 can directly store PID of daemon (step 204) if a process with root privileges identifies itself as an authorized daemon process (step 201). The device driver 102 would not further verify whether the process has root privileges before it drops the privileges.

Figure 4:
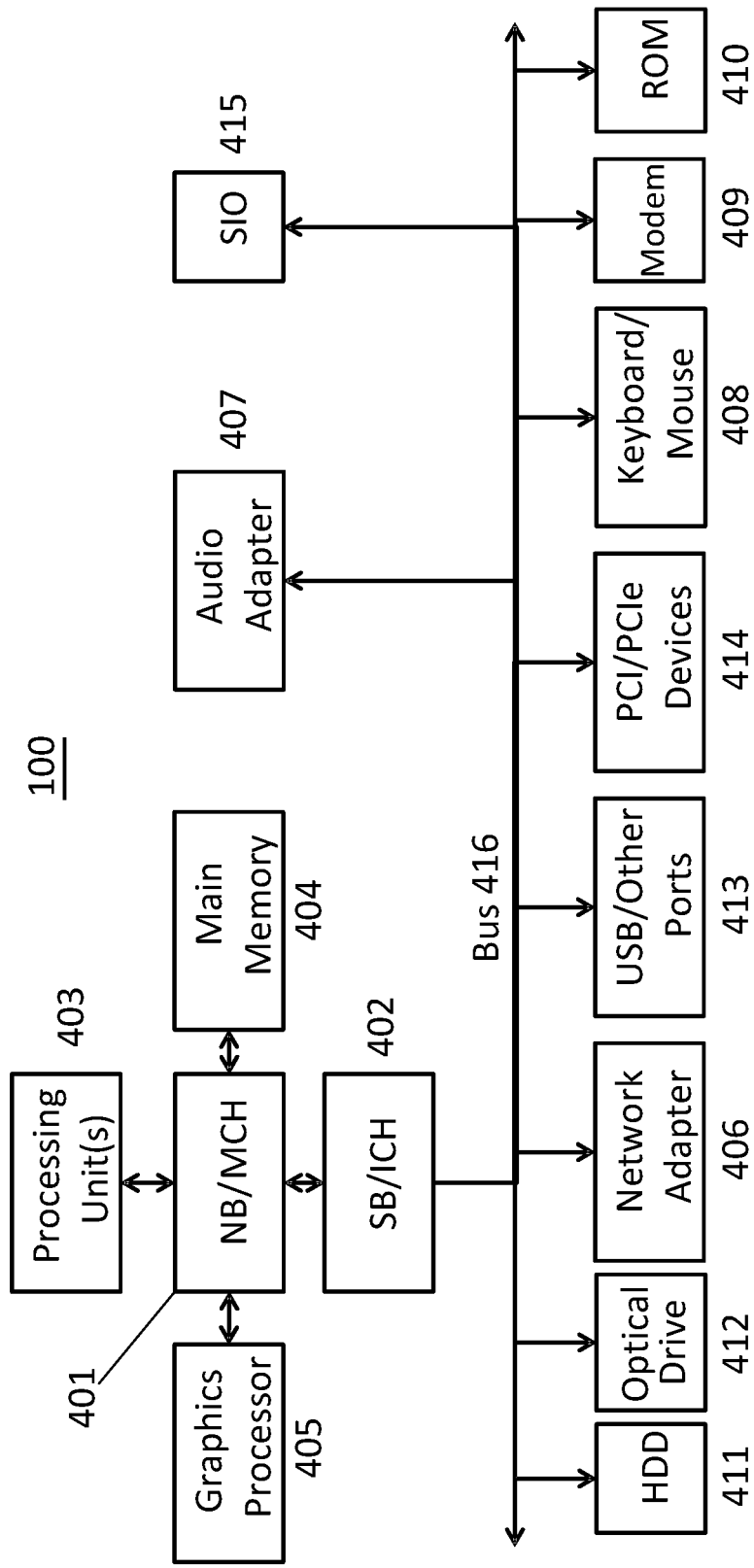
FIG. 4 is a block diagram of another example data processing system in which aspects of the illustrative embodiments may be implemented.

FIG. 4 is a block diagram of an example data processing system 100 in which aspects of the illustrative embodiments may be implemented. In the depicted example, data processing system 100 employs a hub architecture including a north bridge and memory controller hub (NB/MCH) 401 and south bridge and input/output (I/O) controller hub (SB/ICH) 402. Processing unit 403, main memory 404, and graphics processor 405 are connected to the NB/MCH 401. Graphics processor 405 is connected to the NB/MCH through an accelerated graphics port (AGP) (not shown in FIG. 4).

In the depicted example, the network adapter 406 is connected to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 are connected to the SB/ICH 402 through bus system 416. PCI/PCIe devices 414 include Ethernet adapters, add-in cards, and PC cards for notebook computers. ROM 410 may be, for example, a flash basic input/output system (BIOS). The HDD 411 and optical drive 412 use an integrated drive electronics (IDE) or serial advanced technology attachment (SATA) interface. The super I/O (SIO) device 415 is connected to the SB/ICH 402.

An operating system 101 may run on processing unit 403. The operating system 101 may coordinate and provide control of various components within the data processing system 100. An object-oriented programming system, such as the Java™ programming system, may run in conjunction with the operating system and provide calls to the operating system from the object-oriented programs or applications executing on the data processing system 100. As a server, the data processing system 100 may be an IBM® eServer™

System p® running the Advanced Interactive Executive operating system or the Linux operating system. The data processing system 100 may be a symmetric multiprocessor (SMP) system that may include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the bookmarking system may be performed by the processing unit 403 using computer usable program code, which may be located in a memory such as, for example, main memory 404, ROM 410, or in one or more peripheral devices.

A bus system 416 may be comprised of one or more busses. The bus system 416 may be implemented using any type of communication fabric or architecture that may provide for a transfer of data between different components or devices attached to the fabric or architecture. A communication unit such as the modem 409 or network adapter 406 may include one or more devices that may be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 100 may take the form of any of a number of different data processing systems, including but not limited to, client computing devices, server computing devices, tablet computers, laptop computers, telephone or other communication devices, personal digital assistants, and the like. Essentially, data processing system 100 may be any known or later developed data processing system without architectural limitation.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112 (f), unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

What is claimed is:

1. A computer implemented method in a data processing system comprising a processor and a memory comprising instructions, which are executed by the processor to cause the processor to implement the method for accessing a shared resource, comprising:
   identifying, by an operating system, a process having elevated privileges as a background process;
   providing, by the operating system, an authorized user list including at least one user identification number, wherein the authorized user list is configurable by the background process;
   providing, by the operating system, a communication endpoint connectable to a user or a program executed by the user;
   receiving, from the user or the program, a user identification number of the user or the program through the communication endpoint; and
   wherein if the user identification number of the user or the program is in the authorized user list,
      providing, by the operating system, a file descriptor associated with the shared resource; and
      transferring, by the operating system, the file descriptor to the user or the program through the communication endpoint.

2. The method as recited in claim 1, further comprising:
   sending, by the operating system, a clear text challenge;
   receiving, from the user or the program, an encrypted challenge;
   if the encrypted challenge is different from a predefined challenge, the user or the program is disconnected from the communication endpoint, wherein the communication endpoint is a Unix domain socket.

3. The method as recited in claim 1, further comprising:
   transferring, by the operating system, the authorized user list to the shared resource.

4. The method as recited in claim 3, further comprising:
   checking, by the shared resource, whether the process has the elevated privileges, if the process has the elevated privileges,
      storing, by the shared resource, a process identification number of the background process, wherein the background process is a daemon process.

5. The method as recited in claim 4, further comprising:
   checking, by the shared resource, whether the user or the program is a root or the daemon process, if the user or the program is the root or the daemon process,
      performing, by the user or the program, at least one advanced operation on the shared resource, wherein the advanced operation includes at least one of configuring at least one parameter of the shared resource, and modifying the authorized user list.

6. The method as recited in claim 5, wherein if the user or the program is not the root or the daemon process, the method further comprising:
checking, by the shared resource, whether the user identification number of the user or the program is in the authorized user list,
if the user identification number of the user or the program is in the authorized user list,
accessing, by the user or the program, the shared resource through the file descriptor.

7. The method as recited in claim 1, further comprising:
accessing, by the user or the program, an interface of the shared resource, wherein the operating system is a Unix operating system or a Unix-like operating system.

8. A system for accessing a device driver, comprising:
a device driver accessing processor, configured to:
identify, by an operating system, a process having elevated privileges as a background process;
provide, by the operating system, an authorized user list including at least one user identification number, wherein the authorized user list is configurable by the background process;
transfer, by the operating system, the authorized user list to the shared resource;
provide, by the operating system, a communication endpoint connectable to a user or a program executed by the user;
receive, from the user or the program, a user identification number of the user or the program through the communication endpoint; and
wherein if the user identification number of the user or the program is in the authorized user list, the device driver accessing processor is further configured to
provide, by the operating system, a file descriptor associated with the device driver;
transfer, by the operating system, the file descriptor to the user or the program through the communication endpoint; and
access, by the user or the program, an interface of the device driver.

9. The system as recited in claim 8, wherein the device driver accessing processor is further configured to:
send, by the operating system, a clear text challenge;
receive, from the user or the program, an encrypted challenge;
if the encrypted challenge is different from a predefined challenge, the user or the program is disconnected from the communication endpoint, wherein the communication endpoint is a Unix domain socket.

10. The system as recited in claim 8, wherein the device driver accessing processor is further configured to:
check, by the shared resource, whether the process has the elevated privileges, if the process has the elevated privileges,
store, by the device driver, a process identification number of the background process, wherein the background process is a daemon process.

11. The system as recited in claim 10, wherein the device driver accessing processor is further configured to:
check, by the device driver, whether the user or the program is a root or the daemon process, if the user or the program is the root or the daemon process,
perform, by the user or the program, at least one advanced operation on the device driver, wherein the advanced operation includes at least one of configuring at least one parameter of the device driver, and modifying the authorized user list.

12. The system as recited in claim 11, wherein if the user or the program is not the root or the daemon process, the device driver accessing processor is further configured to:
check, by the device driver, whether the user identification number of the user or the program is in the authorized user list,
if the user identification number of the user or the program is in the authorized user list,
access, by the user or the program, the device driver through the file descriptor.

13. The system as recited in claim 8, wherein the device driver accessing processor is further configured to:
send, by the operating system, a clear text challenge;
receive, from the user or the program, an encrypted challenge;
if the encrypted challenge is different from a predefined challenge, the user or the program is disconnected from the communication endpoint, wherein the communication endpoint is a Unix domain socket;
the device driver accessing processor is further configured to:
check, by the device driver, whether the process has the elevated privileges, if the process has the elevated privileges,
store, by the device driver, a process identification number of the background process.

14. The system as recited in claim 13, wherein the clear text challenge is encrypted using a shared secret.

15. A computer program product for accessing a device driver, the computer program product comprising a computer readable storage medium having program instructions embodied therewith, the program instructions executable by a processor to cause the processor to:
identify, by a Unix operating system, a process having elevated privileges as a background process;
provide, by the Unix operating system, an authorized user list including at least one user identification number, wherein the authorized user list is configurable by the background process;
transfer, by the Unix operating system, the authorized user list to the shared resource;
provide, by the Unix operating system, a Unix domain socket connectable to a user or a program executed by the user;
receive, from the user or the program, a user identification number of the user or the program through the Unix domain socket; and
wherein if the user identification number of the user or the program is in the authorized user list, the processor is further caused to
provide, by the Unix operating system, a file descriptor associated with the device driver;
transfer, by the Unix operating system, the file descriptor to the user or the program through the Unix domain socket; and
access, by the user or the program, an interface of the device driver.

16. The computer program product as recited in claim 15, wherein the processor is further caused to:
send, by the Unix operating system, a clear text challenge;
receive, from the user or the program, an encrypted challenge;
if the encrypted challenge is different from a predefined challenge, the user or the program is disconnected from the Unix domain socket.

17. The computer program product as recited in claim 15, wherein the device driver accessing processor is further configured to:
  check, by the device driver, whether the process has the elevated privileges, if the process has the elevated privileges,
    store, by the device driver, a process identification number of the background process, wherein the background process is a daemon process.

18. The computer program product as recited in claim 17, wherein the processor is further caused to:
  check, by the device driver, whether the user or the program is a root or the daemon process, if the user or the program is the root or the daemon process,
    perform, by the user or the program, at least one advanced operation on the device driver, wherein the advanced operation includes at least one of configuring at least one parameter of the device driver, and modifying the authorized user list.

19. The computer program product as recited in claim 18, wherein if the user or the program is not the root or the daemon process, the processor is further caused to:
  check, by the device driver, whether the user identification number of the user or the program is in the authorized user list,
  if the user identification number of the user or the program is in the authorized user list, access, by the user or the program, the device driver through the file descriptor.

20. The computer program product as recited in claim 15, wherein the processor is further caused to:
  send, by the Unix operating system, a clear text challenge;
    receive, from the user or the program, an encrypted challenge;
    if the encrypted challenge is different from a predefined challenge, the user or the program is disconnected from the Unix domain socket;
    the processor is further configured to:
    check, by the shared resource, whether the process has the elevated privileges, if the process has the elevated privileges,
    store, by the device driver, a process identification number of the background process.

\* \* \* \* \*